(12) United States Patent
Goeders

(10) Patent No.: US 11,360,515 B1
(45) Date of Patent: Jun. 14, 2022

(54) PERSONAL HAND-HELD ELECTRONIC DEVICE

(71) Applicant: Jon Jay Goeders, Kirkwood, MO (US)

(72) Inventor: Jon Jay Goeders, Kirkwood, MO (US)

( * ) Notice: Subject to any disclaimer, the term of this patent is extended or adjusted under 35 U.S.C. 154(b) by 0 days.

(21) Appl. No.: 17/207,141

(22) Filed: Mar. 19, 2021

(51) Int. Cl.
| | |
|---|---|
| *G06F 1/16* | (2006.01) |
| *G03B 30/00* | (2021.01) |
| *H04M 1/02* | (2006.01) |
| *H04N 5/225* | (2006.01) |

(52) U.S. Cl.
CPC ............ *G06F 1/1637* (2013.01); *G03B 30/00* (2021.01); *G06F 1/1673* (2013.01); *G06F 1/1686* (2013.01); *H04M 1/0264* (2013.01); *H04M 1/0266* (2013.01); *H04N 5/2257* (2013.01)

(58) Field of Classification Search
CPC .... G06F 1/1601; G06F 1/1605; G06F 1/1626; G06F 1/1633; G06F 1/1637; G06F 1/1662; G06F 1/1671
See application file for complete search history.

(56) References Cited

U.S. PATENT DOCUMENTS

| | | | | |
|---|---|---|---|---|
| 6,542,091 B1* | 4/2003 | Rasanen | ............... | G06F 3/0219 400/489 |
| 10,284,697 B2* | 5/2019 | Yin | ........................ | H04M 1/02 |
| 10,802,644 B2* | 10/2020 | Rasanen | ............. | G06F 3/04883 |
| 2003/0068988 A1* | 4/2003 | Janninck | ............. | H04M 1/0243 455/90.1 |
| 2003/0156381 A1* | 8/2003 | Lieu | ...................... | G06F 1/1666 361/679.09 |
| 2003/0179182 A1* | 9/2003 | Lieu | .................... | H01H 25/041 345/158 |
| 2003/0193477 A1* | 10/2003 | Goodenough | ........ | G06F 3/0219 345/168 |
| 2004/0104896 A1* | 6/2004 | Suraqui | ................. | G06F 3/0237 345/168 |
| 2005/0104847 A1* | 5/2005 | Tanaka | ................ | H04M 1/0247 345/156 |
| 2009/0146959 A1* | 6/2009 | Bartholomew | ...... | H01H 25/041 345/169 |
| 2015/0085184 A1* | 3/2015 | Vidal | .................... | H04N 5/2252 348/376 |
| 2015/0355727 A1* | 12/2015 | Hu | ........................ | G06F 40/232 345/169 |
| 2017/0223158 A1* | 8/2017 | Yin | ........................ | G06F 1/1686 |
| 2019/0272068 A1* | 9/2019 | Newman | ............. | G06F 3/03547 |
| 2020/0228638 A1* | 7/2020 | Ghassabian | ........... | G06F 1/1684 |
| 2020/0296191 A1* | 9/2020 | Zeng | .................... | H04N 5/2252 |

* cited by examiner

*Primary Examiner* — Anthony Q Edwards
(74) *Attorney, Agent, or Firm* — Zarley Law Firm P.L.C.

(57) ABSTRACT

A personal hand-held electronic device having a case and an elongated handle. The case has a front surface, and rear surface, and a side wall, and disposed within the case is a micro-computer. The front surface has an outer perimeter wall and a display. The display has a central portion that displays images and an outer portion that displays a keyboard that extends around on the interior of, and adjacent to, the outer perimeter wall of the front surface of the case.

10 Claims, 3 Drawing Sheets

PERSONAL HAND-HELD ELECTRONIC DEVICE

BACKGROUND OF THE INVENTION

This invention is directed toward a personal hand-held electronic device. More specifically, and without limitation, this invention relates to a personal hand-held electronic device that is easier and faster to use and easier to hold.

Personal hand-held electronic devices such as mobile phones and the like are well-known in the art. Most devices require one to grasp the phone with one hand and input information with the other hand. Also, the keyboard used with these devices, which typically are very small, have the letters, symbols and numbers arranged in a conventional manner similar to a typewriter. While useful, these devices are difficult to hold and use with one hand, and the letters, numbers, and symbols are not arranged in the order of those most frequently used. Therefore, there is a need in the art for a device that addresses these deficiencies.

An objective of the present invention is to provide a personal hand-held electronic device that is easier to hold and use with a single hand.

Another objective of the present invention is to provide a personal hand-held electronic device that is easier and faster to use.

These and other objectives will be apparent to those having ordinary skill in the art based upon the following written description, drawings and claims.

SUMMARY OF THE INVENTION

A personal hand-held electronic device has a case and an elongated handle. The case has a front surface, a back surface, and a side wall, and disposed within the case is a micro-computer. The front surface has an outer perimeter wall and a display. The display has a central portion that displays images and an outer portion that displays a keyboard that extends around the interior of, and adjacent to, the outer perimeter wall.

Positioned on the side wall of the case and connected to the micro-computer are a camera lens, volume buttons, and a mute button. Positioned on the outer perimeter wall and connected to the micro-computer is a dual purpose button that is used to access menus and other sets of symbols or languages for the perimeter screen display. At the end of the elongated handle is a power button and slidably connected to the micro-computer within a slot on the elongated handle is a vertical button that permits one to zoom images, take photos, and allows access to various menus. The micro-computer is adapted to anticipate the next word and sends a signal that lights up the first letter to the anticipated next word on the keyboard.

DETAILED DESCRIPTION OF THE PREFERRED EMBODIMENTS

Figure 1:
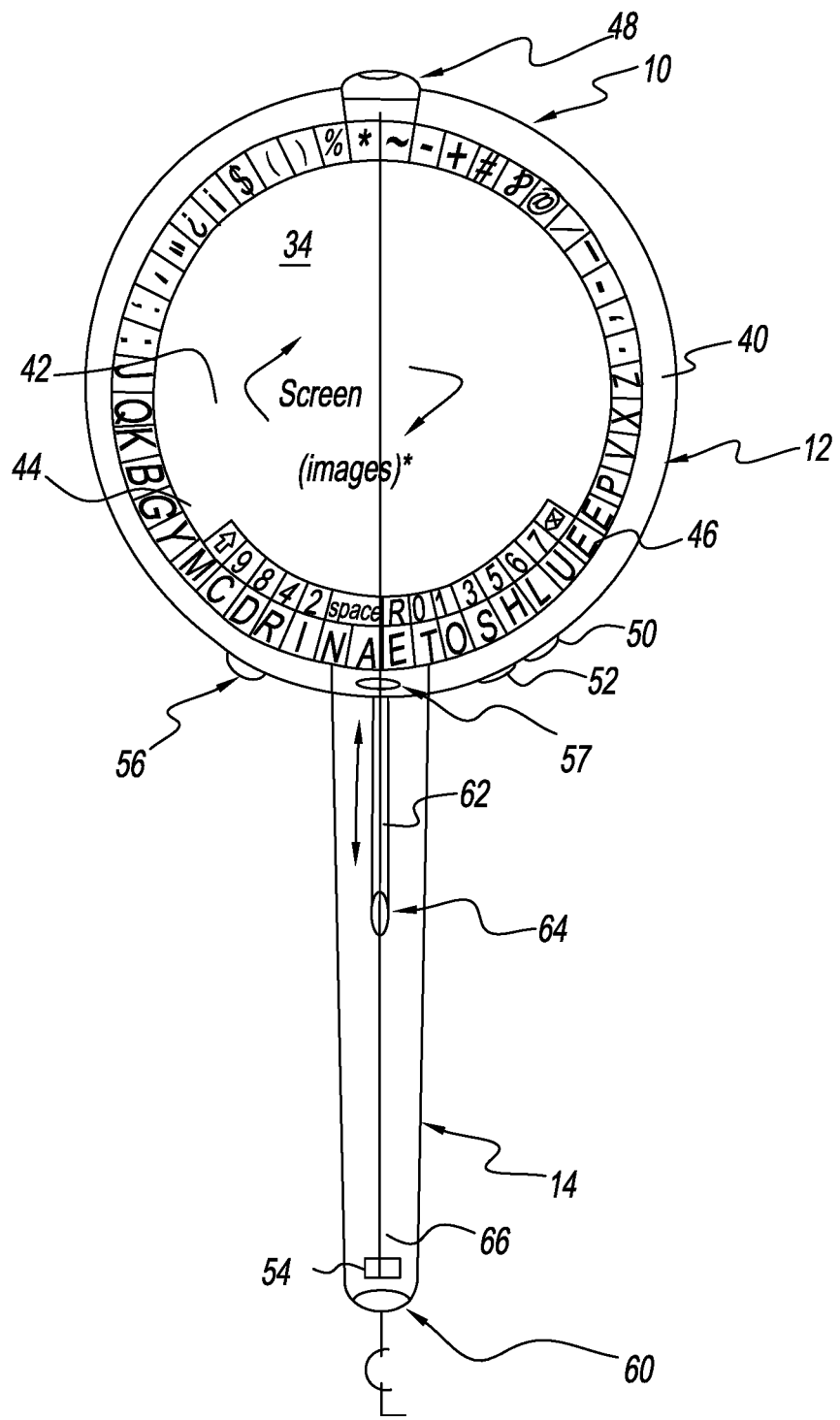
FIG. 1 is a top plan view of a personal hand-held electronic device.
Figure 2:
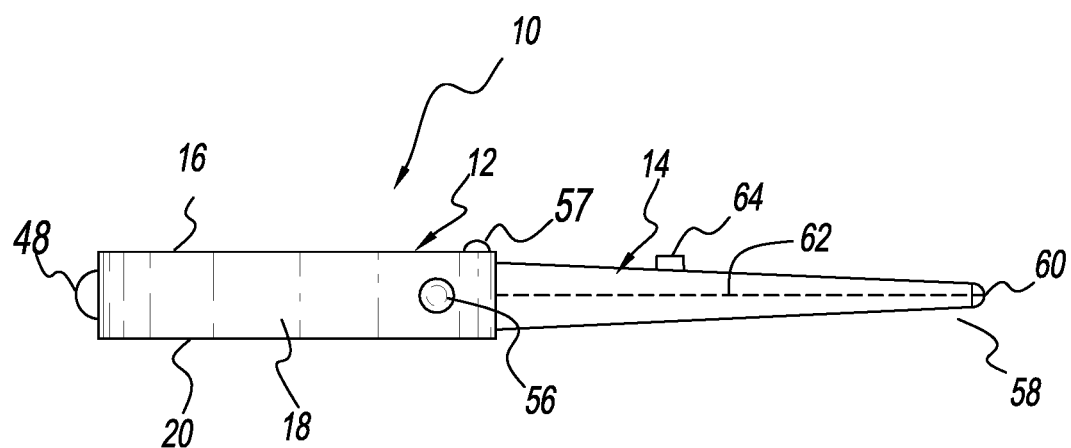
FIG. 2 is a side view of a personal hand-held electronic device.
Figure 3:
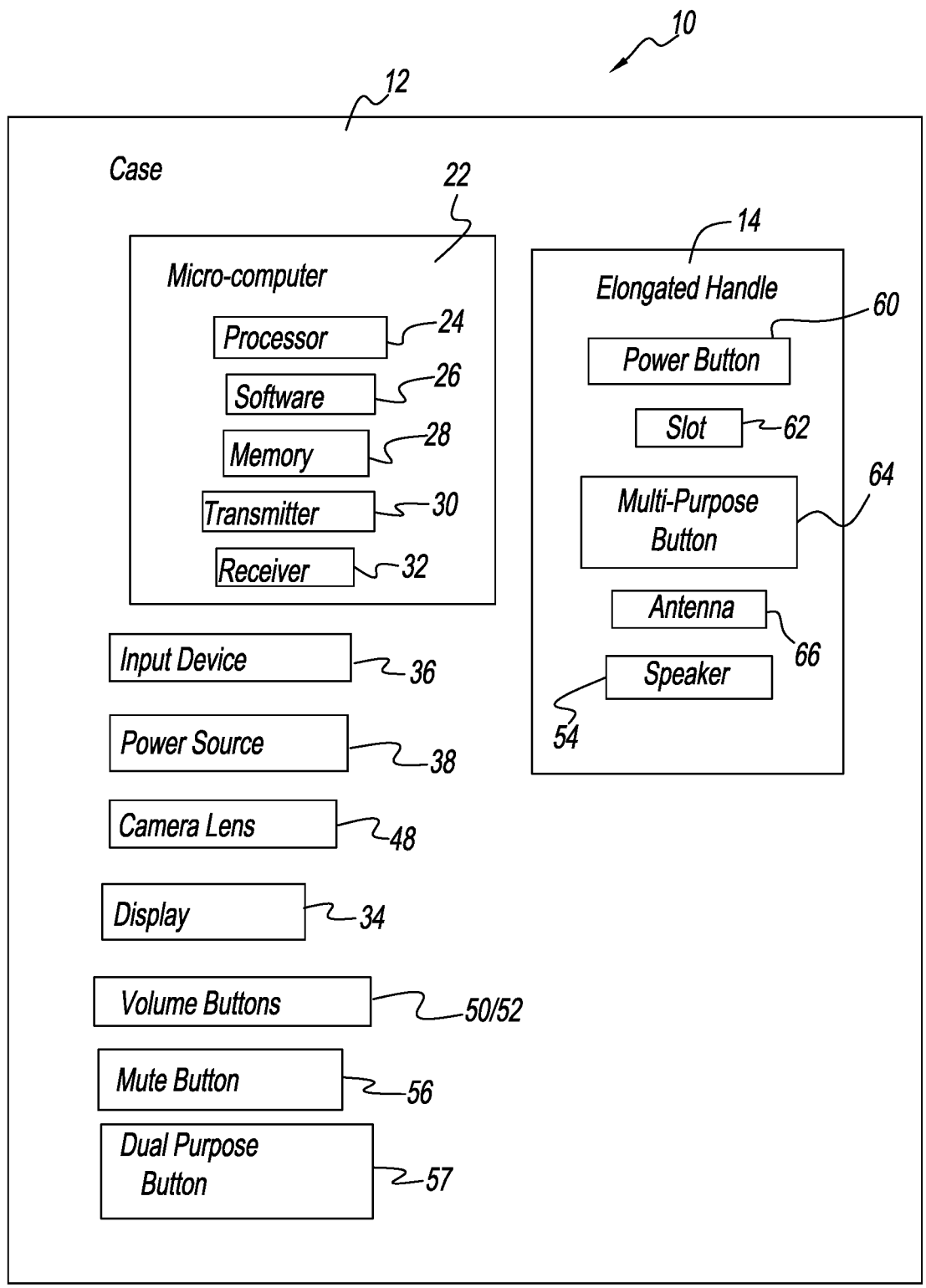
FIG. 3 is a schematic view of a personal hand-held electronic device.

A personal hand-held electronic device 10 includes a case or housing 12 having an elongated handle 14. While the case 12 is of any size, shape, or structure, preferred is that the case 12 is circular and has a first or front surface 16, a side wall 18, and a second or back surface 20. Disposed within the case 12 is a micro-computer 22 having a processor 24, software 26, memory 28, a transmitter 30, receiver 32, display 34, input device 36, and a battery or other power source 38. Preferably, along with an outer perimeter wall 40 of the front surface 16, the display 34 fills the interior to complete the front surface 16.

The display, which preferably is a touch screen and has a central portion 42 to display images 43 and an outer portion 44 that displays a keyboard 46 having letters, numbers, and symbols that extend around on the interior of and adjacent to the outer perimeter wall 40. The letters, numbers, and symbols are arranged in any order, but preferably are arranged based upon those most frequently used according to studies conducted by Cornell University. In particular, looking at the front of the device 10, with the handle 14 extending from a six o'clock position on the case 12, the most frequently used letter, number, or symbol is positioned at the six o'clock position with the next most frequently used letters alternating between immediate right-to-left of six o'clock position as the keyboard 46 extends around the interior of the outer perimeter wall 40.

Positioned at a twelve o'clock position of the side wall 18 of the case 12 and connected to the micro-computer 22 is a camera lens 48. Preferably the camera lens 48 has three positions or settings and is adapted to manually rotate from a first or normal position to a second or front facing position or to a third or back facing position. Also positioned, preferably at about the five o'clock position of the side wall 18 of the case 12 and connected to the micro-computer 22 are a pair of volume buttons 50 and 52 for increasing and decreasing the volume of a speaker 54. Also, preferably at the seven o'clock position of the side wall 18 of the case 12 and connected to the micro-computer 22 is a mute button 56.

At the six o'clock position on the outer perimeter wall 40 of the case is a dual purpose button 57. The dual purpose button 57 is used to access various menus, as well as other sets of letters, symbols, and numbers including those for other languages.

Positioned at the end 58 of the elongated handle 14 is a power or on/off button 60. Also, extending along the length of the elongated handle, preferably adjacent the case 12 is an elongated slot 62 that slidably receives a multi-purpose button 64. The multi-purpose button 64 is connected to the micro-computer 22 and by sliding the multi-purpose button 64 within the slot 62 signals are sent to the micro-computer 22 based upon the position of the button 64 in relation to the slot 62.

Based upon the signal received, the micro-computer 22 processes the signal to activate multiple menus and/or modes of operation. In one example a mode of operation is selected by moving button 64 in relation to slot 62 to change the image 43 of the display and then pressing the button 64 once (i.e. single click) to select the desired mode of operation. By double clicking button 64, or pressing button 64 quickly twice, anywhere along the slot 62, an image 43 is taken with the camera 48. Additionally or alternatively, by sliding button 64 toward the case within the slot 62 a higher resolution of the image 43 on the display 34 is created and/or the image 43 is enlarged. Disposed within the elongated handle 14 and connected to the micro-computer 22 is an antenna 66.

In operation, the device 10 is activated by pressing the power button 60 at the end 58 of the elongated handle 14. The dual purpose button 57 is selected to access desired menus and sets of symbols. The multi-purpose button 64 is then slid along slot 62 to display various modes of operation that display various applications such as a phone application, an internet application, or any other type of application typically found on a personal electronic device 10. The desired mode of operation is selected by clicking on button 64 once. If the phone application, or other application involving sound, is selected, the sound level is adjusted by pressing buttons 50 and 52 to raise and lower the volume or pressing button 56 to mute the sound.

To take a photo, button 64 is slid within slot 62 until the camera application appears and button 64 is clicked once. The camera lens 48 is then positioned in the desired direction, and button 64 is clicked twice to take a photo.

If an application is selected that requires one to input letters, numbers, or symbols the keyboard 46 is activated. Letters, numbers, symbols, and words are selected by clicking button 64 twice if deletion is needed. The micro-computer anticipates the next word and the next letter of the word and the selected key lights up on the keyboard. If the suggested letter is wrong, button 64 is clicked twice.

Therefore, a personal electronic device 10 has been disclosed that is faster and easier to use, easier to hold, and improves upon the art.

From the above discussion and accompanying figure and claims it will be appreciated that the device 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A personal hand-held electronic device, comprising:
    a case having an elongated handle;
    the case having a front surface, a back surface, and a side wall;
    a micro-computer disposed within the case;
    the front surface having an outer perimeter wall and an interior display; and
    a multi-purpose button slidably received within a slot along the length of the elongated handle and is connected to the micro-computer.

2. The device of claim 1 wherein the display has a central portion to display images and an outer portion that displays a keyboard having letters, numbers, and symbols that extend around on the interior of, and adjacent to, the outer perimeter wall.

3. The device of claim 2 wherein the letters, numbers, and symbols are arranged based upon those most frequently used.

4. The device of claim 1 wherein a camera lens is positioned opposite the elongated handle on a side wall of the case.

5. The device of claim 4 wherein the camera is manually adjustable to multiple positions.

6. The device of claim 1 wherein volume buttons and a mute button are positioned on the side wall of the case and connected to the micro-computer.

7. The device of claim 1 wherein a power button is positioned at an end of the elongated handle and is connected to the micro-computer.

8. The device of claim 1 wherein signals are sent to the micro-computer based upon the position of the multi-purpose button in relation to the slot that are adapted to select different modes of operation.

9. The device of claim 8 wherein when an application is selected that activates a keyboard on the display the micro-computer anticipates the next word and lights up the first letter of the next word on the perimeter keyboard.

10. The device of claim 1 wherein a dual purpose button is connected to the micro-computer and positioned on an outer perimeter wall of the front surface of the case.

* * * * *